United States Patent [19]
Leaderman et al.

[11] Patent Number: 5,132,163
[45] Date of Patent: Jul. 21, 1992

[54] FUSED MULTI-PANEL FABRICS

[75] Inventors: Alexander J. Leaderman; Stanley B. Fradin, both of Pikesville, Md.

[73] Assignee: Rockland Industries, Inc., Baltimore, Md.

[21] Appl. No.: 412,463

[22] Filed: Sep. 26, 1989

[51] Int. Cl.$^5$ ............................................. B32B 23/02
[52] U.S. Cl. ..................... 428/192; 428/193; 428/246; 428/253; 428/284
[58] Field of Search ............... 428/192, 193, 253, 254, 428/284, 296, 246; 160/231.2

[56] References Cited

U.S. PATENT DOCUMENTS

| | | | |
|---|---|---|---|
| 4,698,276 | 10/1987 | Duval | 428/193 |
| 4,780,351 | 10/1988 | Czempoyesh | 428/193 |
| 5,068,936 | 12/1991 | Blitzer | 428/192 |

OTHER PUBLICATIONS

Morton Gilbert, What makes fusibles stick?, Apparel Industry Magazine, Jul., 1984.

Primary Examiner—James J. Bell
Attorney, Agent, or Firm—Banner, Birch, McKie & Beckett

[57] ABSTRACT

Multipaneled fabric elements such as draperies, curtains and bedspreads, or linings used therewith and, a method for making are disclosed. The elements include a fabric substrate. The fabric may be a woven textile, knit or non-woven material. The edges on either side of the fabric substrate are coated with a fusible material. The panels are cut to a predetermined length from a roll of the coated substrate. At least one edge of each panel is fused to the edge of the adjacent panel to create the finished element. Additional coatings such as a blackout layer may also be applied to the substrate.

20 Claims, 2 Drawing Sheets

FUSED MULTI-PANEL FABRICS

BACKGROUND OF THE INVENTION

1. Field of the Invention

The present invention relates to multi-panel fabric elements such as draperies, curtains or bedspreads and to multi-panel linings for use therewith, and more particularly, to improved multi-panel fabric elements and the method for producing them in which the edges of the plurality of panels which make up the elements are joined by fusing.

2. Description of the Prior Art

Multi-panel fabric elements are known in the prior art and may be used as draperies, curtains or bedspreads, or as linings for use therewith. The types of fabrics which may be used to construct fabric elements include woven textiles, knits, or non-woven materials or any other appropriate fabric, depending on the desired quality and intended use of the finished product. The finished fabric element is constructed of a plurality of individual panels of the fabric, generally cut from a commercially produced length of the fabric.

Normally, the panels are sewed together along the lengthwise edges to form the finished product. The edges may be folded back behind the plane of the panel before sewing, or simply overlapped depending on the type of finished product which is being manufactured. However, joining the panels by sewing requires the need for highly skilled labor, operating expensive commercial sewing equipment. Since the equipment is expensive and since even during normal production the skilled laborers are highly paid, the price of the finished product is increased accordingly. Furthermore, the equipment is susceptible to normal wear and tear and break downs, increasing production costs due to the expense of routine maintenance, replacement and repair, and also due to lost manufacturing time in which idle employees must be paid. Finally, sewing thread also increases the cost of the finished product.

Furthermore, sewing of the panels results in other disadvantages depending upon the particular finished product which is being manufactured. For example, blackout draperies or blackout drapery linings are used by hotels and motels in order to ensure that guest rooms can be maintained substantially dark at all times of the day. Draperies or drapery linings are generally made of a woven textile substrate, or of inexpensive non-woven substrates. The substrate may also be coated, for example, with one or more layers of an acrylic latex based compound, or may be treated with resins such as water repellent, or with fire-retardant materials, or with selected combinations. If the drapery or lining is to be used to blackout a room, at least one opaque layer is applied, for example, an opaque layer may be created by mixing an acrylic with a black pigment such as carbon black to provide the blackout effect. The coated substrate is manufactured in commercial rolls generally having a length of 100–200 yards and a width of 48"–68", although the rolls may be manufactured in any desired length or width. The blackout coating is applied throughout one surface, such that usually an uncoated edge or selvage which is typically $\frac{3}{8}"-\frac{5}{8}"$ remains on either side throughout the length of the substrate. That is, a cross-section along the width of the substrate includes an uncoated selvage, the coated region, and a second uncoated selvage.

In order to manufacture a drapery or lining of appropriate size, a plurality of panels are cut from the coated substrate such that the length of each panel is identically equal to a predetermined length, for example, the approximate height of the window with which the drapery or lining is to be used. The selvages of each panel are folded over so as to be angled to the plane of the panel, and the selvage of one panel is placed adjacent to a selvage of an adjacent panel. The selvages are sewed together at a location near the plane of the panel to create the finished drapery or lining. The number of panels used to make one finished product is based on a predetermined width, for example, a width sufficient to extend across the window with allowance for any pleatings or hems which are used.

Blackout elements created by this method not only suffer from the drawback of large production costs as discussed above, but also suffer from a degradation of the blackout effect due to the needle holes penetrating the panels. The penetrating light creates a "dancing" or "sparkling" effect and is projected onto the opposed face of the drapery material, or into the room itself if the finished product is not a lining but the drapery itself. It is therefore desired to overcome the deficiencies such as increased cost and degraded blackout effect encountered in the use of sewing to join panels together.

SUMMARY OF THE INVENTION

The present invention is directed to multi-panel fabric elements such as draperies, curtains or bedspreads, or linings for use therewith, and to a method of making the fabric elements. The elements are made of a plurality of panels of fabric substrate which may be cut from a prepared roll of substrate. Appropriate fabrics include woven textiles, knits or non-woven fabrics. At least one of the longitudinal edges of the roll of substrate is coated with a layer of fusible material such that at least one edge of each cut panel will be coated as well. The coated edge of one panel is joined to an edge of an adjacent panel which may also be coated, and the edges are fused to form the finished element. Appropriate fusible materials include polyamides, polyesters, copolyamides or copolyesters or other suitable materials, and the edges of the panels are fused together by the application of heat and pressure such as by ironing.

In additional embodiments, if the finished element is a lining, the outermost edges of the finished lining may be fused directly to the opposing surface of the drapery, bedspread or curtain to create a finished drapery, curtain, or bedspread combined with a lining. Furthermore, the fabric elements may be coated with one or more layers of an acrylic latex based compound, or have an acrylic based finish. The fabric element may also be treated with a variety of textile finishes such as resins including soil or water repellent, or with fire-retardant materials or with selected combinations. In a still further embodiment, the elements are blackout draperies or linings and are coated with at least one layer of an opaque material. For example, the opaque layer may be an acrylic latex based compound mixed with a black pigment such as carbon black to block light.

The present invention provides the advantage of decreased production costs since fusing is faster than sewing and requires less skill. Thus unskilled and inexpensive labor may be used, and less paid production time per finished product is required. Additionally, the need for expensive commercial sewing machines and associated equipment, and the corresponding expense of routine maintenance, repair and downtime is eliminated. Finally, if the element is a black-out drapery or a black-out lining to be used with drapery or curtains, fusing eliminates the needle holes which result from sewing, preventing unwanted light penetration through the finished lining.

Further objects, features and other aspects of this invention will be understood from the detailed description of the preferred embodiments of this invention with reference to the drawings.

DETAILED DESCRIPTION OF THE PREFERRED EMBODIMENTS

Figure 1:
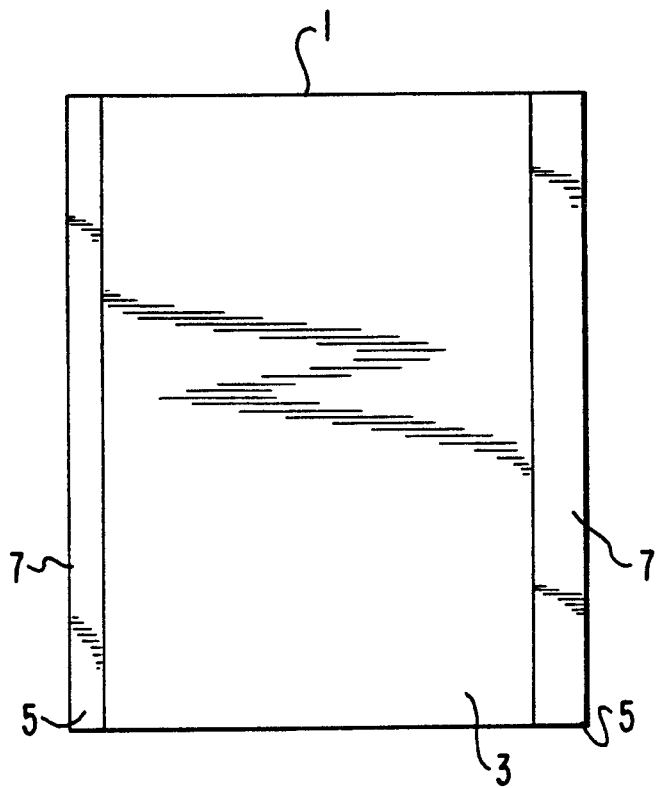
FIG. 1 shows a single panel having a coated substrate used to make a fabric element according to the present invention.

With reference to FIG. 1, panel 1 is made of a fabric substrate such as a woven textile, knit or non-woven material, depending on the type of final product being produced, and the quality. Selvages 5 extend throughout the length of panel 1 along both sides. The width of selvages 5 depends upon the type of final product which is being manufactured, but are generally in the range of $\frac{1}{4}"-\frac{1}{2}"$, although any desired width can be used. At least one of selvages 5 is coated, before the panels are cut, with fusible layer 7. Suitable materials for the fusible layer include, for example, polyamide, polyester, co-polyamide or copolyester.

Several suitable techniques are known for applying the fusible layer to the fabric substrate. In a preferred embodiment, the fusible layer is applied by the hot melt application method in which solid fusible material is heated to the liquid state, and is applied to the substrate, for example by spraying or printing. Other suitable techniques include scatter coating, in which the fusible material is ground into small discrete, particles and applied evenly over the fabrics. The coated fabric is heated until it adheres to the substrate. In the paste printing process, a fine powder of fusible material is mixed with water, glycerine, polynols and other chemicals into a paste and is printed on the fabric. The coated fabric is heated to evaporate the water in the paste. In the powder dot method small dots or powder are printed onto a fabric from an engraved roll which turns under a supply. The printed fabric is then moved through an oven where the powder melts and fuses to the cloth.

Figure 2:
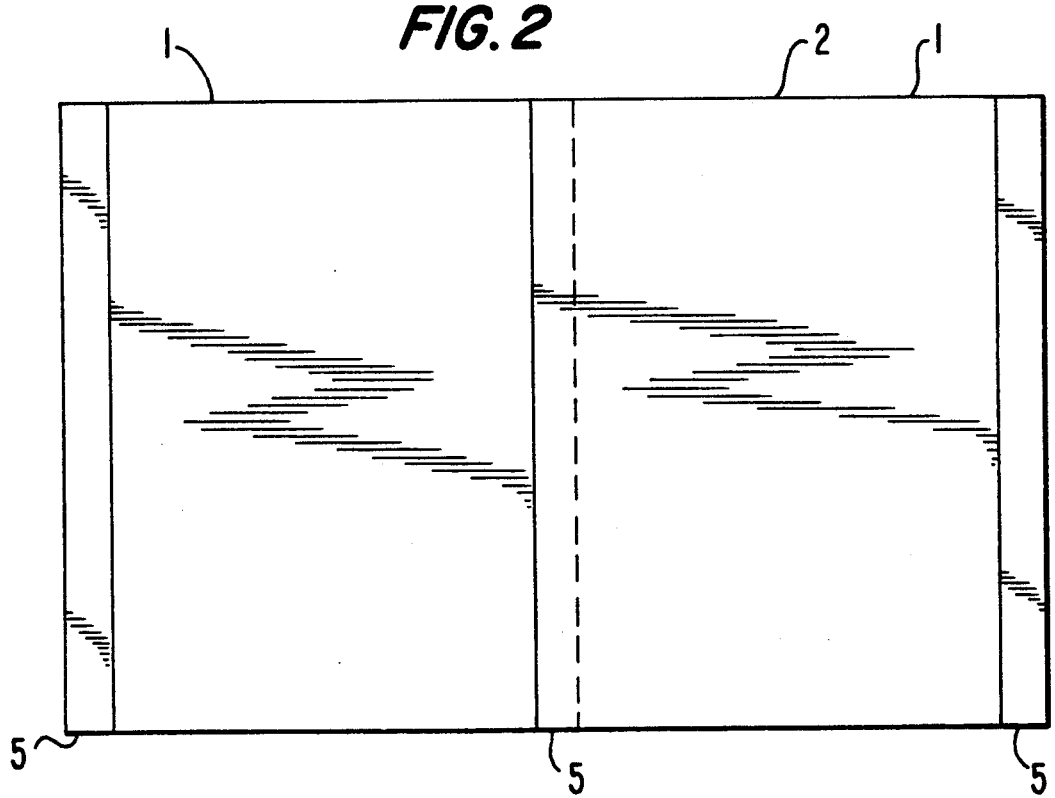
FIG. 2 shows a fabric element according to the present invention.

With reference to FIG. 2, finished fabric element 2 which may be a drapery, curtain or bedspread, or a lining to be used therewith, is manufactured by cutting a plurality of panels 1 from a commercial length roll of the selvage coated substrate such that the length of each panel 1 is identically equal to a predetermined length. For example, if the finished element is to be a drapery, curtain or a lining for use therewith, the length will be generally a little longer than the height of the window with which the finished element is to be used. Of course, the panels may be produced individually as well. The number of panels needed to make one finished element would be determined by the overall width needed for the final product, for example the width of the window to be covered with allowance for any pleatings or hems which are used. Similar determinations would be made if the product is to be a bedspread. Selvage 5 of one panel 1 is contacted to a selvage of the immediately adjacent panel, either by simple overlapping, or by folding back both selvages to assume an angled position with respect to the plane of panel 1. The selvages are fused together by the application of heat and pressure, for example, by the application of a hot iron to create a finished element of appropriate length and width. If the selvages are angled before fusing, the fused selvages are folded back along the plane of the finished element.

The commercial length roll of substrate may also be further coated or treated before being cut into individual panels. For example, the substrate may be coated with one or more layers of an acrylic latex based compound, or may have an acrylic finish applied throughout the surface except at the selvages. The substrate may also be treated with a variety of textile finishes including resins such as water or soil repellent, or with fire-retardant materials or with selected combinations. Additionally, the substrate may have only one selvage coated with fusible material, or may have one selvage eliminated altogether. In the latter case, the additional treating or coatings would extend substantially to one side of the substrate, and thus of the cut panels. In order to create the finished product, the selvage coated with fusible material would be contacted to the non-treated selvage, or directly to the side of the panel which has no selvage. Of course, all of the above coatings or treatments may be applied to individually prepared panels.

With further reference to FIG. 1, if finished element 2 is to be used as a blackout drapery or blackout drapery lining, panel 1 is further coated with at least one opaque layer 3, generally extending throughout the surface except for selvage or selvages 5. Any suitable material may be used for the opaque layer. For example, opaque layer 3 may comprise one or more layers of an acrylic latex based compound such that at least one layer includes an opaque material such as black pigment, for example, carbon black. If the selvages are not coated with the opaque material, and if the panels are manufactured with selvages at both sides, then the selvages must be folded back at an angle to the plane of the panels before fusing. Of course, selvages 5 may be coated both with the opaque layer as well as the fusible layer and any addiitonal treating as discussed above may be applied to the panels as desired.

For all embodiments, the fusing technique of the present invention is quicker than the prior art in which the panels are sewed together, and also requires less skilled and less expensive labor than the prior art. Additionally, the present invention eliminates the need for expensive commercial sewing equipment, associated equipment and the costs associated with maintaining and repairing the equipment, as well as sewing thread. Thus the cost of the finished product is significantly reduced by the present invention. Lost production time due to breakdown of the sewing equipment is also avoided. Additionally, if the finished elements are blackout draperies or linings and are coated with an opaque layer such as a carbon black layer so as to block light, the use of the method of the present invention completely eliminates the stitch holes which allow unwanted penetration of light. Thus the present invention allows for a product with superior blackout performance as well.

Figure 3:
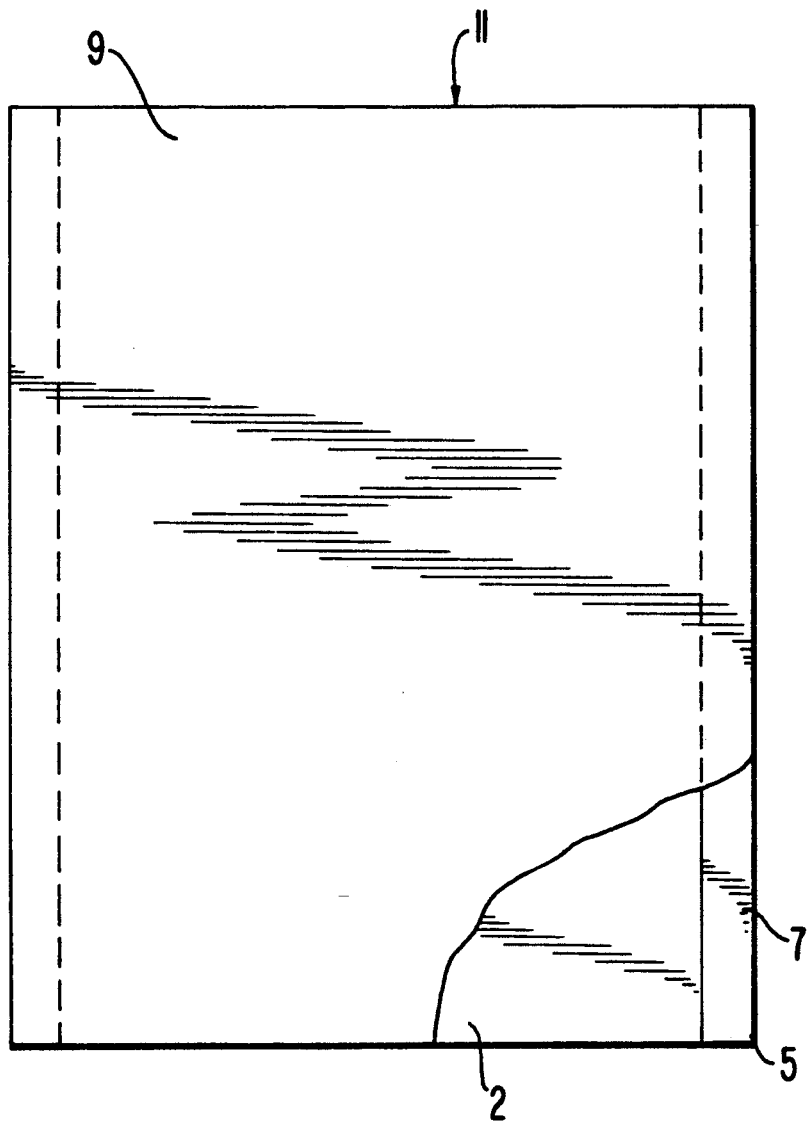
FIG. 3 is a partially cut-away view showing a combined lining and drapery, curtain or bedspread according to a second embodiment of this invention.

In a further embodiment, as shown in FIG. 3, the fabric element is lining 2 and the outermost selvages of the panels which are not fused directly to other selvages may be fused to the inner facing surface of drapery, bedspread or curtain 9 such that drapery, bedspread or curtain 9 and lining 2 may be sold as single unit 11. Additionally, if a single panel is cut from cloth wide enough to be used as a complete drapery, curtain or bedspread, such that it need not be fused to additional panels, the fusible selvages may be folded over and ironed so as to create a non-stitched hem at the sides of the finished product.

This invention has been described in detail in connection with the preferred embodiments. These embodiments, however, are merely for example only and the invention is not restricted thereto. It will be understood by those skilled in the art that other variations and modifications can easily be made within the scope of this invention as defined by the appended claims.

We claim:

1. A combination of a drapery and a lining, said lining comprising a plurality of substantially opaque panels, each of said panels comprising a fabric substrate having edges on both sides, at least one of said edges of each panel coated with a layer of a fusible material, the edge of one panel fused with the edge of an adjacent panel and the outermost said edges of said one panel fused with said drapery.

2. The combination recited in claim 1, said opaque panels comprising panels coated throughout on at least one surface with a layer of opaque material.

3. A combination of a drapery and a lining, said lining comprising a plurality of panels, each of said panels comprising a fabric substrate having edges on both sides, at least one of said edges coated with a layer of a fusible material, the edges of one panel fused with the edges of an adjacent panel and the outermost said edges of the outermost panels fused with said drapery, each panel except the outermost of said panels coated throughout on at least one surface with a layer of opaque material except at said edges, said outermost panels also coated throughout on at least one surface with a layer of opaque material such that said layer of opaque material also covers said edges fused with said drapery.

4. The combination recited in claim 3, wherein said edges which are fused to other edges are folded behind the plane of said lining.

5. A combination of a drapery and a lining, said lining comprising one substantially opaque panel, said panel comprising a fabric substrate having edges on both sides coated with a fusible material, said edges of said panel fused with said drapery.

6. The combination recited in claim 5, said opaque panel comprising a panel coated throughout one surface with an opaque material.

7. The combination recited in claim 6, said opaque material comprising a layer of acrylic latex based compound.

8. The combination recited in claim 5, said edges having a width in the range of approximately $\frac{3}{8}''-\frac{5}{8}''$.

9. The combination recited in claim 1, said fabric substrate comprising a woven textile substrate.

10. The combination recited in claim 1, said fusible material comprising a polyamide, polyester, copolyamide or copolyester, said opaque material comprising a black pigment.

11. The combination recited in claim 10 said edges having a width in a range of approximately $\frac{3}{8}''-\frac{5}{8}''$.

12. The combination recited in claim 1, said fabric substrate comprising a non-woven or knit material.

13. The combination recited in claim 1, said panels treated with textile finishes such as resins or with fire-retardant material.

14. The combination recited in claim 5, said fusible material comprising a polyamide, polyester, copolyamide or copolyester, said opaque material comprising black pigment.

15. The combination recited in claim 5, said edges having a width in the range of approximately $\frac{3}{8}''-\frac{5}{8}''$.

16. The combination recited in claim 3, said fusible material comprising a polyamide, polyester, copolyamide or copolyester.

17. The combination recited in claim 5, said edges having a width in the range of approximately $\frac{3}{8}''-\frac{5}{8}''$.

18. The combination recited in claim 5, said substrate being a woven textile.

19. The combination recited in claim 5, said substrate being knit.

20. The combination recited in claim 5, said substrate being a non-woven material.

* * * * *